Oct. 26, 1965 E. P. ROSS 3,214,110
SPEED CONTROL APPARATUS
Filed Feb. 18, 1963
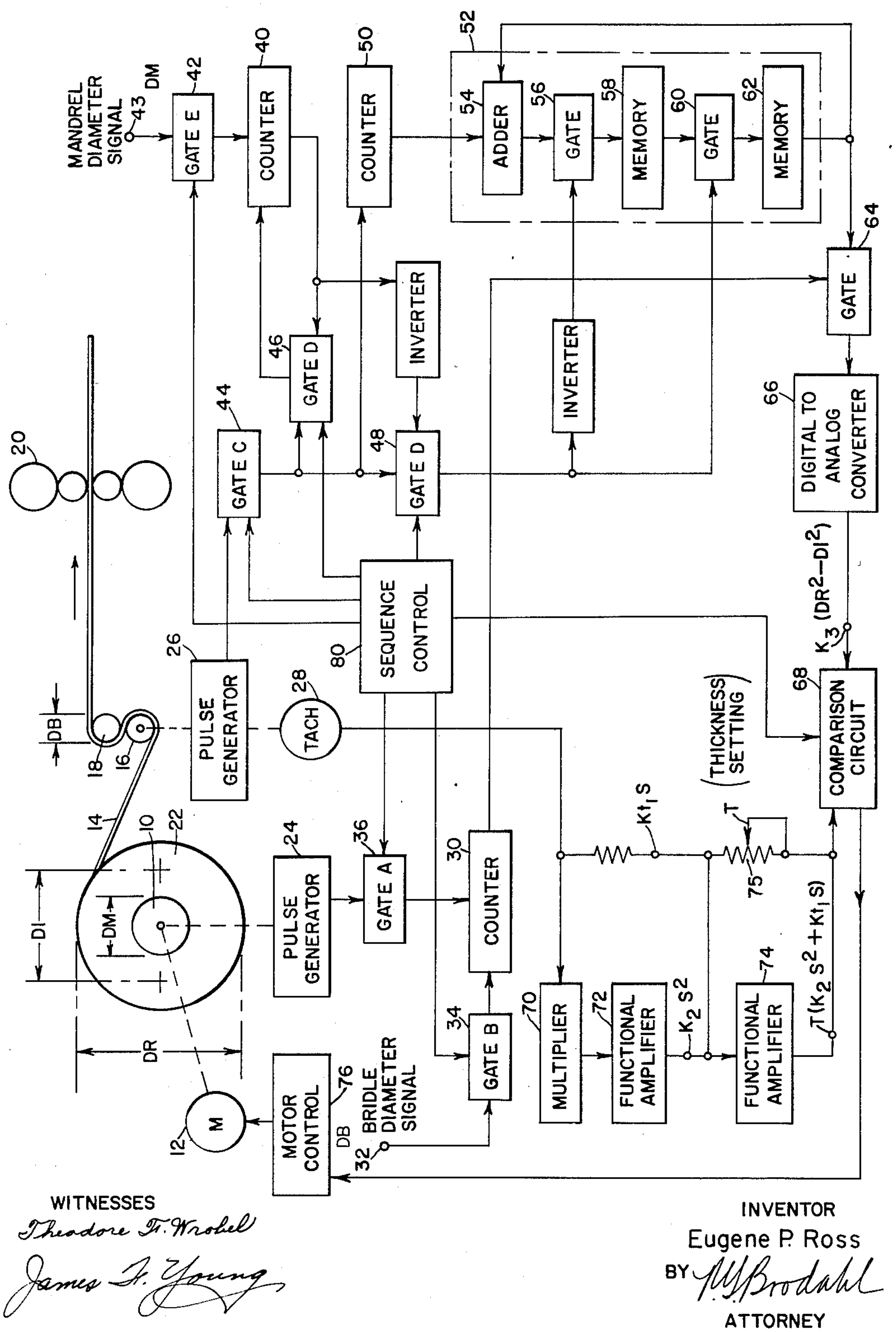
WITNESSES
Theodore F. Wrobel
James F. Young
INVENTOR
Eugene P. Ross
BY M. J. Brodahl
ATTORNEY United States Patent Office 3,214,110
Patented Oct. 26, 1965

3,214,110
SPEED CONTROL APPARATUS

Eugene P. Ross, Tonawanda Township, Erie County, N.Y., assignor to Westinghouse Electric Corporation, Pittsburgh, Pa., a corporation of Pennsylvania Filed Feb. 18, 1963, Ser. No. 259,258
5 Claims. (Cl. 242—75.47)

The present invention relates in general to speed control apparatus for a reel device, and more particularly to deceleration control apparatus for a strip uncoiling reel device and is operative to initiate deceleration thereof at the proper time, such that, when a known slowdown rate is used, the reel device reaches a desired low speed of operation or stopped condition with a few turns of coil strip remaining on the reel device.

It has been the practice in the operation of strip reel devices of the prior art to manually slowdown the reel device after the human operator had watched the coiled strip remaining on the reel to determine as an estimate when to initiate the slowdown by manual braking or well known drive motor deceleration techniques. It has been difficult to so control the deceleration of a strip reel device, as desired such that, when a predetermined slow speed is reached or the reel device has stopped there will be only a few turns of strip on the reel device as is desired.

It is an object of the present invention to provide an improved speed control apparatus for a strip reel device, which is operative better to initiate the slowing down or deceleration of the reel device to more accurately bring the reel device to a desired minimum speed of operation or even a full stopping of same, and to provide a higher accuracy by leaving in the order of only ten turns of strip material on the mandrel of the reel device for high speed rolling mills and even better accuracy for low speed rolling mills.

It is a different object of the present invention to provide an improved speed control apparatus for a strip reel device, which is better operative to provide substantially the same number of desired wraps or turns on the reel device repeatedly after deceleration of same regardless of the operational speed of the reel device at the time the deceleration was started and regardless of the mandrel diameter on which the strip material is wound or coiled.

In accordance with the teachings of the present invention, a first pulse generator is coupled to the reel device and a second pulse generator and a tachometer are both coupled to a constant diameter reference roll which rotates at a rate proportional to strip speed. The diameter of the strip coil on the reel device at any given moment can be determined by counting the number of pulses from the constant diameter reference roll second pulse generator during the time the reel device makes a known number of revolutions. Using this determined value of coil diameter and the known strip thickness, the present speed control apparatus can determine the amount of strip still coiled on the reel device at any given time. By comparing this length of strip material still coiled on the reel device to a signal which is a function of line speed and, therefore, a function of the amount of strip or the strip length necessary to decelerate with a predetermined amount of strip material remaining on the reel device, the initiation of the deceleration can thereby be determined. A substantially linear deceleration rate is obtained with a motor operated rheostat or the equivalent ramp function device.

The specification will now proceed with a more detailed discussion of the invention in conjunction with the drawing, in which there is shown a schematic diagram of the circuit connections for the present speed control apparatus.

In the drawing there is shown the reel device 10 to be controlled. A drive motor 12 is connected to operate the reel device 10. The strip material 14 travels from the reel device 10 and between a bridle roll 16 and its companion roll 18 toward a rolling mill 20 or the like. The bridle roll 16 has a known reference diameter DB. The reel device 10 includes an inner mandrel on which is wound the coil 22 of strip material. The diameter DM of the reel mandrel is shown as is the diameter DB of the bridle roll 16. A pulse generator 24 is coupled to the reel device 10. A pulse generator 26 is coupled to the constant diameter bridle roll 16 as is a tachometer 28.

A first signal counter 30 is preset in accordance with the complement of the bridle diameter (9999–DB) through an input terminal 32 and a gate circuit 34. The counter 30 is also operative to receive the output pulses from the pulse generator 24 through a gate circuit 36. A second counter 40 is operative to receive through a gate circuit 42 the complement of the mandrel diameter (9999–DM) from a terminal 43. The counter 40 is also operative to receive pulses from the pulse generator 26 through a gate circuit 44 and a gate circuit 46 as will be later explained.

The pulses from the pulse generator 26 are also supplied through a gate circuit 44 to a third signal counter 50. The total signal count of the counter 50 is supplied to an accumulator 52 including an adder 54, a gate 56, a memory 58, another gate 60 and another memory 62. The output from the accumulator 52 is supplied through a gate 64 to a digital-to-analog converter 66 and then to a comparison circuit 68.

The accumulator performs the function of providing a digital output signal proportional to $DR^2-DM^2$, in accordance with the equation $$N_1^2-N_2^2=\sum_{n=N_{2+1}}^{n=N_1}(2n-1)$$

when $N_1$ is proportional to DR and $N_2$ is proportional to DM, $n$ is the number of pulses from the bridle pulse generator 26 and DR is the actual diameter of strip on the reel device 10. The counter 40 and the counter 50 receive pulses from the bridle pulse generator 26 until a number of pulses proportional to the mandrel diameter DM is reached, at which time counter 40 is full and stops counting, and at the same time opens gate 48 to allow accumulator operation. This means that no summing operation is performed until $n=N2+1$, in accordance with the above equation. By alternately opening and closing gates 56 and 60 in proper time phase with pulses to the counter 50, the output of the accumulator is added to the input from counter 50 each time a pulse is delivered to the counter, thereby performing the summing action indicated by the above equation. This continues until $n=N_1$, which occurs when a number of pulses is received by counter 30 from the reel pulse generator 24 proportional to the bridle diameter DB and counter 30 is full and stops counting. At this time, the comparison is made by the comparison circuit 68 as will be later explained.

The output signal from the tachometer 28 in accordance with the actual movement speed of the strip 14 is supplied to a Hall multiplier 70 and a first functional amplifier 72 and a second functional amplifier 74 for providing an output signal to a second input of the comparison circuit in accordance with the strip length $x$ strip thickness where the strip length is that required to complete the deceleration of the reel device 10 from its full speed operation to a desired low speed operation which might be a full stop condition. The output signal from the comparison circuit 68 is supplied to control the motor 12 through a motor control 76 or a similar motor and control for the rolling mill 20 or the like, which is normally the controlling influence for reel speed. The first functional amplifier 72 is used to amplify the signal level from the Hall multiplier, and the second functional amplifier 74 is used to combine the signal from the first amplifier and a tachometer signal to obtain a function $K_2S^2+Kt_1S$ and is also used to multiply this function by strip thickness T, by means of a degenerative feedback signal through a potentiometer 75, whose resistance is set proportional to strip thickness T. In this way there is provided a net signal output of $T(K_2S^2+Kt_1S)$.

In the operation of the present speed control apparatus it is desired to compare the strip length necessary to complete the deceleration or slowdown of the reel device to the desired minimum operating speed with the calculated strip length between DR, the present momentary diameter of the strip coil on the reel device, and a deceleration point diameter D1 at which the deceleration should be initiated.

The length of strip on the reel device can be determined by the dividing the area of the strip coil by the thickness of the strip. The area can be determined by the formula relationship $$A=\frac{\pi}{4}DR^2-\frac{\pi}{4}DM^2$$

Thusly, the length L of strip on the reel device can be found by the formula relationship $$L=\frac{\pi}{4T}(DR^2-DM^2) \text{ or } L=\frac{K_3}{T}(DR^2-DM^2)$$

If the length of strip between the actual diameter DR and the reference diameter D1 is L1, the formula relationship $$L1=\frac{\pi}{4T}(DR^2-D1^2)$$

is true.

In determining the strip length required to accomplish the deceleration operation, the time to stop the reel device $T=K_1S$, where S is the strip speed and $K_1$ is some constant. The length of strip required for the deceleration operation can be defined as $L_d=\frac{1}{2}ST$ or $\frac{1}{2}K_1S^2$ or $K_2S^2$. If an amount to compensate for the necessary delay introduced by the control apparatus itself is included this can be the quantity $Kt_1S$. Thusly, the strip length to accomplish the deceleration or slowdown operation can be defined as $L_d=(K_2S^2+Kt_1S)$. In the operation of the present invention, control apparatus for design purposes, instead of directly comparing $(K_2S^2+Kt_1S)$ to $$\frac{K_3}{T}(DR^2-DM^2)$$

the circuits are arranged to compare $T(K_2S^2+Kt_1S)$ to $K_3(DR^2-DM^2)$, which is mathematically identical. The comparison circuit is operative such that, if the strip length required to accomplish the deceleration operation is larger than the actual strip length remaining between the actual coil diameter DR and the reference diameter D1, then a signal is supplied to the motor control 76 or the like for decelerating the reel device 10 through the proper control operation of the motor 12 or other motor controlling the strip speed. On the other hand, if the calculated strip length required to accomplish the deceleration operation is less than the calculated actual strip length remaining between the diameter DR and the diameter D1 the speed control apparatus, as shown in the drawing, repeats the above previous calculations of the strip length required to complete the deceleration operation and the calculation of the present strip length between the diameter DR and the reference diameter D1.

In the operation of the control apparatus, as shown in the drawing, the counters 30, 40 and 50 are reset initially to zero as is the accumulator 52. Then there is preset into the counter 30 the complement of the bridle diameter DB, and there is preset into the counter 40 the complement of the mandrel diameter DM. The presetting of the counter 30 is readily accomplished by a well known and conventional sequence control 80 opening the gate 34 and the presetting of the counter 40 is accomplished by the sequence control opening the gate 42. The gates 34 and 42 are thereafter closed. The gates 36, 44 and 46 are now caused to open by the sequence control 80, and the pulses from the pulse generator 24 are supplied to the counter 30 in accordance with the operating speed of the reel device 10, and the pulses from the pulse generator 26 are supplied to the counters 40 and 50 in accordance with the speed of the strip passing over the bridle roll 16 and, therefore, taken off the reel device 10. When the counter 40 counts up to the quantity 9999, to count out the mandrel diameter DM, the sequence control 80 closes the gate 46 and opens the gate 48, such that succeeding pulses from the pulse generator 26 alternately cause the gate 56 to open and the contents of the adder 54 are supplied to and stored in the memory 58 then the gate 56 closes and the gate 60 opens such that the quantity stored in the memory 58 passes through the gate 60 and is now stored in the memory 62. The output from the memory 62 is now supplied back to the adder 54 and is added to the signal count stored in the counter 50. The pulses from pulse generator 26 cause this sequence to repeat itself until the counter 30 counts up to the quantity 9999, to count out the bridle diameter DB, at which time the sequence control 80 causes the comparison circuit to compare the output signal from the functional amplifier 74, in accordance with the quantity strip length $x$ strip thickness required to complete the slowdown operation at the particular strip speed, with the contents of memory 62, in accordance with the calculated $$\frac{\text{strip length}}{\text{strip thickness}}$$

between the actual coil diameter DR and the artificial diameter D1. If the signal from the functional amplifier 74 is greater than the signal from the digital-to-analog converter 66, the comparison circuit 68 provides a slowdown signal or deceleration signal to the motor control 76. If the signal from the functional amplifier 74 is less than the signal from the digital-to-analog converter 66, the comparison circuit 68 does not provide the slowdown or deceleration signal to the motor control 76 and the sequence control 80 repeats the above described sequence of operation.

It should be understood that provisions may be made for inserting different mandrel diameter values to simulate coil faults or fault slowdown. For example, in some instances, it is desired to reduce the strip speed automatically at diameters other than the mandrel diameter, due to strip defects and so forth. This may be accomplished by supplying a fictitious mandrel diameter signal, actually equal to the diameter at which slow speed is desired.

Although a preferred embodiment of the invention has been described in such detail as to facilitate reproduction by those versed in this art, such description is to be considered illustrative rather than limiting for the invention may be altered somewhat without departing from its fundamental concepts and the spirit of the subject invention.

I claim as my invention:

1. Speed control apparatus for a strip reel device operative with a moving strip having a predetermined thickness, comprising strip speed sensing means operative with the moving strip to provide a first control signal including pulses in accordance with the strip speed, reel speed sensing means operative with said reel device to provide a second control signal including pulses in accordance with the reel speed, strip coil diameter determining means responsive to the number of first control signal pulses which occur during the provision of a predetermined number of the second control signal pulses for determining the coil diameter of the strip on said reel device, and reel speed controlling means operative to determine the length of strip remaining on the reel device as a predetermined function of said coil diameter and said thickness, with said reel speed controlling means being operative to control the speed of the reel device in accordance with said strip length and said strip speed to provide a desired minimum strip speed when a desired minimum number of coil turns remain on the reel device.

2. Deceleration control apparatus for a strip reel device operative with a moving strip having a predetermined thickness, comprising first pulse generator means operative with the moving strip for providing a first pulsed signal having pulses in accordance with the strip speed, second pulse generator means operative with said reel device for providing a second pulsed signal having pulses in accordance with the reel speed, strip diameter determining means responsive to the number of first signal pulses which occur during the time interval required to provide a predetermined number of the second signal pulses for determining the coil diameter of the strip on said reel device, and strip speed controlling means operative to determine the length of strip remaining on the reel device as a predetermined function of said coil diameter and said thickness, with said strip speed controlling means being operative to control the speed of the strip through control of the reel device in accordance with said strip length and said strip speed to decelerate the strip speed until a desired minimum number of coil turns on the reel device.

3. Deceleration control apparatus for a strip reel device operative with a moving strip having a predetermined thickness, and including strip speed sensing means operative with the moving strip to provide first control signal pulses in accordance wth the strip speed, reel speed sensing means operative with said reel device to provide second control signal pulses in accordance with the reel speed, first strip length determining means responsive to the number of first control signal pulses which occur during the provision of a predetermined number of the second control signal pulses for determining the coil diameter of the strip on said reel device and responsive to the thickness of the strip for determining the length of strip actually on said reel device, and second strip length determining means responsive to said first control signal pulses for determining the length of strip required to decelerate said reel device to a predetermined minimum speed.

4. In speed control apparatus for a strip reel device operative with a moving strip having a predetermined thickness, strip speed sensing means operative with the moving strip to provide a first pulsed signal in accordance with the strip speed, reel speed sensing means operative with said unwinding reel device to provide a second pulsed signal in accordance with the reel speed, strip diameter determining means responsive to the pulses of said first control signal which occur during a predetermined portion of the second control signal pulses for determining the coil diameter of the strip on said reel device, and speed controlling means operative to determine the length of strip remaining on the reel device as a predetermined function of said coil diameter and said thickness said speed controlling means being operative to control the operation of the reel device in accordance with said strip length and said strip speed to provide a predetermined operation of said reel device when a predetermined number of coil turns remain on the reel device.

5. Deceleration control apparatus for a strip reel device operative with a moving strip having a predetermined thickness, and including strip speed sensing means operative with the moving strip to provide first control signal pulses in accordance with the strip speed, reel speed sensing means operative with said reel device to provide second control signal pulses in accordance with the reel speed, first strip length determining means responsive to the number of first control signal pulses which occur during the provision of a predetermined number of the second control signal pulses for determining the coil diameter of the strip on said reel device and responsive to the thickness of the strip for determining the length of strip actually on said reel device, and second strip length determining means responsive to said first control signal pulses for determining the length of strip required to decelerate said reel device to a predetermined minimum speed, and strip length comparison means operative to provide a predetermined control of said reel device when the determined length of strip actually on said reel device is less than the determined length of strip required to decelerate the reel device.

References Cited by the Examiner

UNITED STATES PATENTS

| | | | |
|---|---|---|---|
| 2,968,451 | 1/61 | Schneider | 242—75.51 |
| 3,061,228 | 10/62 | Andrade | 242—75.51 |
| 3,151,507 | 8/64 | Canova et al. | 242—74.51 X |

MERVIN STEIN, *Primary Examiner.*